(12) United States Patent
Kunihiro et al.

(10) Patent No.: US 11,200,417 B2
(45) Date of Patent: Dec. 14, 2021

(54) DETERMINATION APPARATUS AND METHOD TO ENHANCE ACCURACY IN DETERMINING THE PRESENCE OF AN ERRONEOUSLY DETECTED EYELID

(71) Applicant: MITSUBISHI ELECTRIC CORPORATION, Tokyo (JP)

(72) Inventors: Kazuki Kunihiro, Tokyo (JP); Yudai Nakamura, Tokyo (JP); Takashi Hirano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/962,383

(22) PCT Filed: Feb. 13, 2018

(86) PCT No.: PCT/JP2018/004888
§ 371 (c)(1),
(2) Date: Jul. 15, 2020

(87) PCT Pub. No.: WO2019/159229
PCT Pub. Date: Aug. 22, 2019

(65) Prior Publication Data
US 2021/0073510 A1 Mar. 11, 2021

(51) Int. Cl.
*G06K 9/46* (2006.01)
*G06K 9/00* (2006.01)

(52) U.S. Cl.
CPC ....... *G06K 9/0061* (2013.01); *G06K 9/00604* (2013.01); *G06K 9/00845* (2013.01); *G06K 9/4661* (2013.01)

(58) Field of Classification Search
None
See application file for complete search history.

(56) References Cited

U.S. PATENT DOCUMENTS

| 2009/0244274 | A1* | 10/2009 | Morita | G06K 9/00248 348/78 |
| 2010/0014759 | A1* | 1/2010 | Suzuki | G06K 9/00248 382/195 |
| 2010/0094176 | A1* | 4/2010 | Ohue | G08B 21/06 600/595 |

(Continued)

FOREIGN PATENT DOCUMENTS

| JP | 2007-34436 A | 2/2007 |
| JP | 2011-95826 A | 5/2011 |
| JP | 2011-125620 A | 6/2011 |

OTHER PUBLICATIONS

International Search Report (PCT/ISA/210) issued in PCT/JP2018/004888 dated May 1, 2018.

*Primary Examiner* — Idowu O Osifade
(74) *Attorney, Agent, or Firm* — Birch, Stewart, Kolasch & Birch, LLP

(57) ABSTRACT

An area extraction unit (2) extracts an eye area in an image of a driver. An eyelid detection unit (3) detects an eyelid in the eye area. A reliability calculation unit (4) calculates an eyelid reliability by using luminance information of the eye area and positional information of the eyelid detected by the eyelid detection unit (3). A determination unit (5) determines that the eyelid has not been properly detected, when the eyelid reliability is less than a first threshold value.

7 Claims, 7 Drawing Sheets

(56) References Cited

U.S. PATENT DOCUMENTS

| | | | | |
|---|---|---|---|---|
| 2012/0014610 A1* | 1/2012 | Nakashi | ............. | G06K 9/00281 |
| | | | | 382/195 |
| 2013/0027661 A1* | 1/2013 | Nomura | ............... | A61B 3/1035 |
| | | | | 351/206 |
| 2014/0037144 A1* | 2/2014 | Hiramaki | ........... | G06K 9/00281 |
| | | | | 382/103 |
| 2014/0112580 A1* | 4/2014 | Hanita | ................. | G06K 9/0061 |
| | | | | 382/165 |
| 2021/0153754 A1* | 5/2021 | Ozawa | .................... | B60N 2/90 |

* cited by examiner

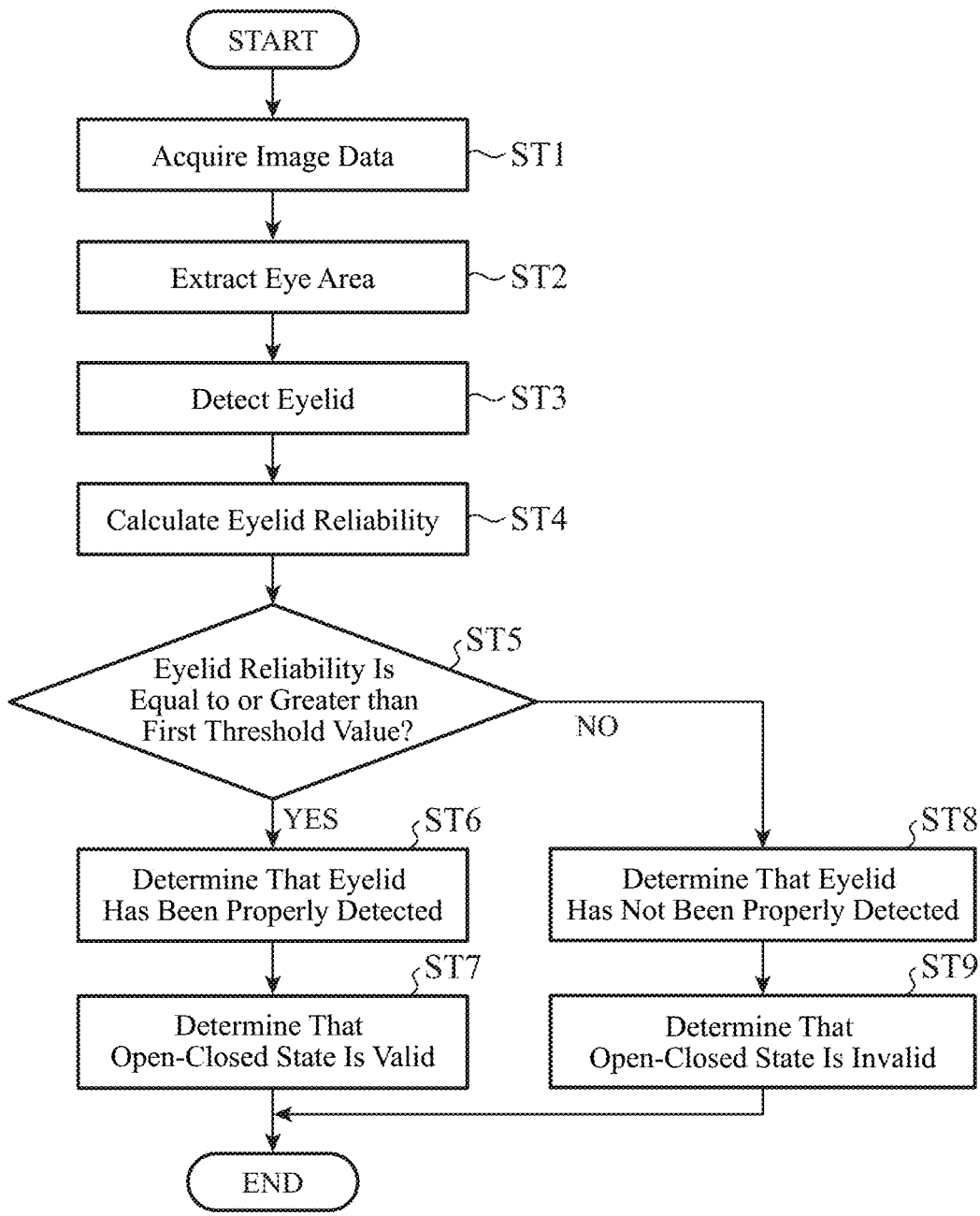

Reflection of Scenery

Reflection of Scenery

DETERMINATION APPARATUS AND METHOD TO ENHANCE ACCURACY IN DETERMINING THE PRESENCE OF AN ERRONEOUSLY DETECTED EYELID

TECHNICAL FIELD

The present invention relates to an apparatus for determining whether an eyelid has been erroneously detected.

BACKGROUND ART

A driver monitoring apparatus for imaging a vehicle interior to thereby detect failing asleep, sleepiness or the like of a driver, is known. When the driver wears eyeglasses or sunglasses (hereinafter, "sunglass" is also referred to as "eyeglass"), a case may arise where an eyelid is not properly detected due to reflection of scenery in an eyeglass lens surface, hiding of the eyelid by an eyeglass frame, or the like. If the eyelid is not properly detected, capability of detecting the falling asleep, sleepiness or the like of the driver is degraded.

In Patent Literature 1, there is described an arousal degree estimation apparatus that, when an eye(s) is erroneously detected, estimates an arousal degree while taking information of the erroneous detection into consideration. The arousal degree estimation apparatus of Patent Literature 1 detects gray levels of pixels along each pixel row in the vertical direction in an image, to thereby extract a pixel group of the eye, by use of the fact that the gray levels in a region corresponding to the eye locally become lower than the other. In addition, the arousal degree estimation apparatus of Patent Literature 1 determines whether the detected eye(s) is due to erroneous detection. For example, the arousal degree estimation apparatus of Patent Literature 1 determines erroneous detection by using a positional relationship of the detected right and left eyes, such as a distance between the right and left eyes.

CITATION LIST

Patent Literature

Patent Literature 1: Japanese Patent Application Laid-open No. 2007-34436

SUMMARY OF INVENTION

Technical Problem

However, according to the arousal degree estimation apparatus of Patent Literature 1, accuracy is low in determining whether or not the eye (s) is erroneously detected. For example, even in the case where scenery is reflected in an eyeglass lens surface around the eye and the reflected scenery is erroneously detected as an eye, the eye will not be determined to be erroneously detected if determination of erroneous detection is performed using a positional relationship of the right and left eyes as in Patent Literature 1. Thus, it is determined that the eye has been properly detected, so that processing will be performed while using the reflected scenery as an eye. The erroneous detection of an eye is also, and ultimately, the erroneous detection of eyelids.

This invention has been made to solve the problem as described above, and an object thereof is to provide an erroneous detection determination apparatus which can improve accuracy in determining whether or not an eyelid has been erroneously detected.

Solution to Problem

An erroneous detection determination apparatus according to the invention is characterized by including: processing circuitry to acquire image data indicating an image of a driver; to extract an eye area in the image by using the image data acquired to detect an eyelid in the eye area extracted to calculate an eyelid reliability by using luminance infommtion of the eye area extracted and positional information of the eyelid detected; and to determine that the eyelid has not been properly detected, when the eyelid reliability calculated is less than a first threshold value, in which the processing circuitry calculates the eyelid reliability by using inner products of respective luminance vectors obtained from the luminance information and respective normal vectors of an eyelid line obtained from the positional information.

Advantageous Effects of Invention

According to this invention, since the determination is made on the basis of the eyelid reliability calculated by using the luminance information of the eye area and the positional information of the detected eyelid, it is possible to improve accuracy in determining whether or not the eyelid has been erroneously detected.

BRIEF DESCRIPTION OF DRAWINGS

FIG. 3 is a flowchart showing an example of processing by the erroneous detection determination apparatus according to Embodiment 1.

DESCRIPTION OF EMBODIMENTS

Hereinafter, for illustrating the invention in more detail, an embodiment for carrying out the invention will be described with reference to the accompanying drawings.

Embodiment 1

Figure 1:
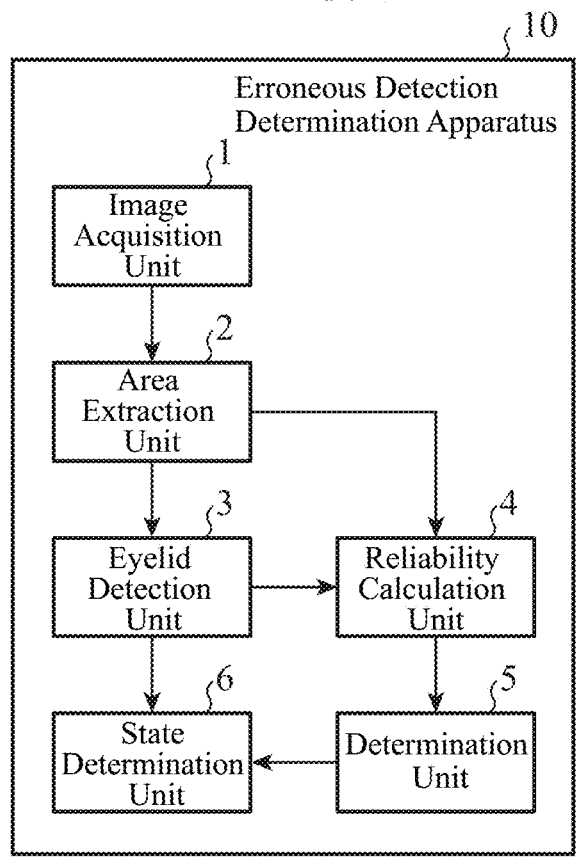
FIG. 1 is a diagram showing a configuration of an erroneous detection determination apparatus according to Embodiment 1.

FIG. 1 is a diagram showing a configuration of an erroneous detection determination apparatus 10 according to Embodiment 1. The erroneous detection determination apparatus 10 includes an image acquisition unit 1, an area extraction unit 2, an eyelid detection unit 3, a reliability calculation unit 4, a determination unit 5 and a state determination unit 6.

The image acquisition unit 1 acquires image data indicating an image of a driver. In the following, description will be made on a case, as an example, where the erroneous detection determination apparatus 10 is installed in a vehicle. In this case, from an unshown camera that is installed in the vehicle and serves to image the driver, the image data indicating the image of the driver is outputted.

The image acquisition unit 1 outputs the acquired image data to the area extraction unit 2.

Using the image data acquired by the image acquisition unit 1, the area extraction unit 2 extracts an eye area in the image indicated by the image data. The eye area is an area that includes at least an eye, and is smaller than the face area. An image processing technique for extracting, from an image of a person, an eye area of the person is a publicly known technique, so that the details thereof will be omitted. For example, an image processing technique is used in which the face area of a person is specified and a horizontally-long area defined in an upper region in the face area is determined as an eye area of the person.

Out of the image data acquired by the image acquisition unit 1, the area extraction unit 2 outputs partial image data corresponding to the eye area of the driver, to the eyelid detection unit 3 and the reliability calculation unit 4.

Using the image data outputted from the area extraction unit 2, the eyelid detection unit 3 detects an eyelid in the eye area extracted by the area extraction unit 2. An image processing technique for detecting the eyelid is a publicly known technique, so that the details thereof will be omitted. For example, such an image processing technique as cited in Patent Literature 1 is used in which gray levels of pixels are detected along each pixel row in the vertical direction in an image, and positions at which the gray levels change locally are detected as corresponding to the eyelid.

The eyelid detection unit 3 outputs positional information of the detected eyelid to the reliability calculation unit 4 and the state determination unit 6. The positional information of the eyelid is information by which an eyelid line as shown, for example, in FIG. 2A, FIG. 2B, FIG. 6A or FIG. 6B to be described later, can be determined. For example, the positional information of the eyelid contains: a coordinate position of the inner corner of the eye, in the eye area; a coordinate position of the outer corner of the eye, in the eye area; and a mathematical function representing the shape of an eyelid line.

Using luminance information of the eye area extracted by the area extraction unit 2 and the positional information of the eyelid detected by the eyelid detection unit 3, the reliability calculation unit 4 calculates an eyelid reliability. The luminance information of the eye area can be determined using the image data outputted from the area extraction unit 2, by the reliability calculation unit 4. The eyelid reliability is an index indicating reliability as to whether the eyelid detected by the eyelid detection unit 3 is a real eyelid. This means that the higher the eyelid reliability, the more correctly the eyelid detection unit 3 has detected the eyelid. The reliability calculation unit 4 outputs the calculated eyelid reliability to the determination unit 5.

FIG. 2A, FIG. 2B, FIG. 3 and FIG. 4 are diagrams for explaining an example of a calculation method of the eyelid reliability.

Figure 2A:
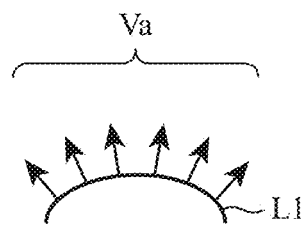
FIG. 2A is a diagram showing an example of an eyelid line.

Using the positional information of the eyelid outputted from the eyelid detection unit 3, the reliability calculation unit 4 determines, for example, an eyelid line L1 as shown in FIG. 2A. The eyelid line L1 indicates the eyelid detected by the eyelid detection unit 3. One end of the eyelid line L1 corresponds to the inner corner of the eye and the other end thereof corresponds to the outer corner of the eye.

The reliability calculation unit 4 plots the eyelid line L1 on the eye area. At this time, by referring to, for example, the coordinate positions of the inner and outer corners of the eye in the eye area, the coordinate positions being contained in the positional information of the eyelid, the reliability calculation unit 4 plots the eyelid line L1 on the eye area. The eye area corresponds to an image indicated by the image data that the reliability calculation unit 4 has acquired from the area extraction unit 2.

Figure 2B:
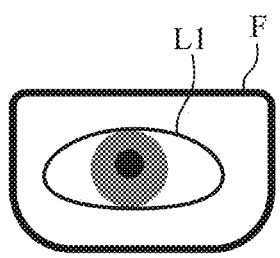
FIG. 2B is a diagram when the eyelid line of FIG. 2A is plotted.
Figure 5A:
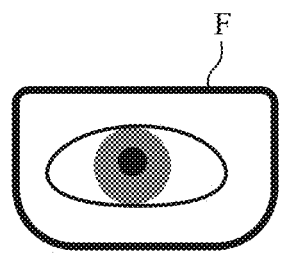
FIG. 5A is a diagram showing condition around a driver's eye in a case where no scenery is reflected in an eyeglass lens surface.

FIG. 2B is a diagram when the eyelid line L1 is plotted on the eye area. FIG. 2A and FIG. 2B show an eyelid line and an eyelid-line plotted state in the case where condition around the driver's eye is as shown in FIG. 5A to be described later, in which an eyeglass frame F is also shown. As shown in FIG. 2B, the eyelid line L1 is well-matched to the actual eyelid. The reliability calculation unit 4 calculates a normal vector Va with respect to the eyelid line L1, for each of the pixels on the eyelid line L1. The normal vectors Va with respect to the eyelid line L1 are as shown in FIG. 2A.

Figure 3:
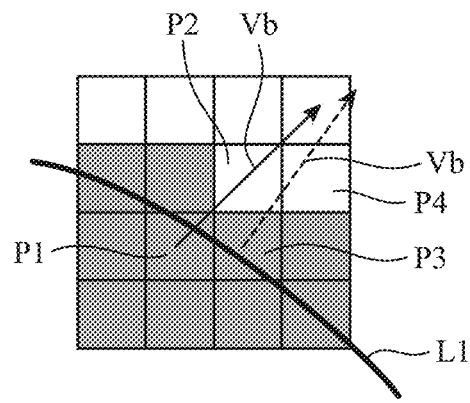
FIG. 3 is an illustration diagram of luminance vectors.

In addition, the reliability calculation unit 4 calculates a luminance vector Vb, for each of the pixels on the eyelid line L1. The reliability calculation unit 4 determines the luminance information of the eye area by using the image data outputted from the area extraction unit 2, and uses the information for the calculation of the luminance vectors Vb. FIG. 3 is an illustration diagram of the luminance vectors Vb. The luminance vector Vb is a vector indicating an increasing direction of luminance. For example, the luminance vector Vb of a pixel P1 is provided as a vector directed therefrom to a pixel P2 that is the only white pixel among pixels surrounding the pixel P1. Mote that a luminance vector Vb of a pixel that is surrounded using multiple white pixels is provided as, for example, a vector that passes through a barycenter of the multiple white pixels. For example, the luminance vector Vb of a pixel P3 that is surrounded using two white pixels P2, P4, passes between the pixel P2 and the pixel P4 as indicated in FIG. 3 by a broken line. Note that the normal vector Va and the luminance vector Vb each have, for example, a length of a unit vector.

The more the eyelid detected by the eyelid detection unit 3 is matched to the actual eyelid, the higher the degree of similarity between the normal vector Va and the luminance vector Vb becomes. Thus, the reliability calculation unit 4 calculates an eyelid evaluation value indicating the degree of similarity between the normal vectors Va and the luminance vectors Vb. It is meant that the larger the eyelid evaluation value, the more similar the normal vectors Va and the luminance vectors Vb are to each other. The eyelid evaluation value corresponds to, for example, inner products of the normal vectors Va and the luminance vectors Vb. The reliability calculation unit 4 calculates the inner product of the normal vector Va and the luminance vector Vb, for each of the pixels on the eyelid line L1, and determines a total value of the inner products as the eyelid evaluation value. Note that the eyelid evaluation value may be an evaluation value based on something other than the inner product, so long as the eyelid evaluation value indicates a degree of similarity between the normal vectors Va and the luminance vectors Vb. For example, the eyelid evaluation value may be an inverse number of a total value of angles formed by the normal vectors Va and the luminance vectors Vb.

Figure 4:
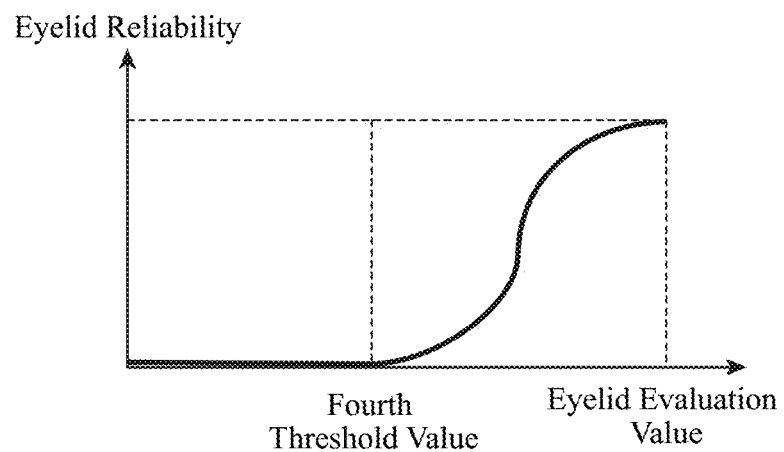
FIG. 4 is a graph showing a relationship between an eyelid evaluation value and an eyelid reliability.

After calculation of the eyelid evaluation value, the reliability calculation unit 4 converts the calculated eyelid evaluation value to the eyelid reliability. FIG. 4 is a graph showing a relationship between the eyelid evaluation value and the eyelid reliability. When the eyelid evaluation value is not less than a fourth threshold value, the eyelid reliability is calculated according to the eyelid evaluation value. In contrast, when the eyelid evaluation value is less than the fourth threshold value, the eyelid reliability is calculated to be a minimum value, for example, zero. Note that, when the eyelid evaluation value is less than the fourth threshold value, the reliability calculation unit 4 may decrease, instead of uniformly setting the eyelid reliability to the minimum value, the eyelid reliability in a stepwise manner according to the eyelid evaluation value. Further, the relationship between the eyelid evaluation value and the eyelid reliability may be a relationship that represents direct proportion therebetween, instead of that in FIG. 4. Further, the reliability calculation unit 4 may use as the eyelid reliability, the eyelid evaluation value as it is. In short, various methods are conceivable for converting the eyelid evaluation value to the eyelid reliability.

The example shown in FIG. 2A and FIG. 2B corresponds to, for example, the case where condition around the driver's eye is as shown in FIG. 5A. In FIG. 5A, no scenery is reflected in the eyeglass lens surface, so that the eyelids appear clearly in the image.

Figure 5B:
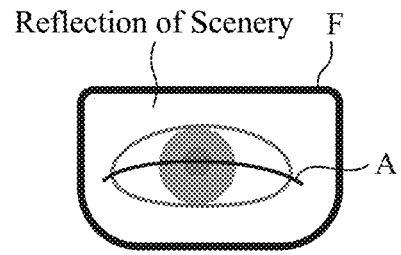
FIG. 5B is a diagram showing condition around the driver's eye in a case where scenery is reflected in the eyeglass lens surface.
Figure 6A:
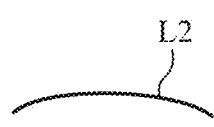
FIG. 6A is a diagram showing an example of an eyelid line.
Figure 6B:
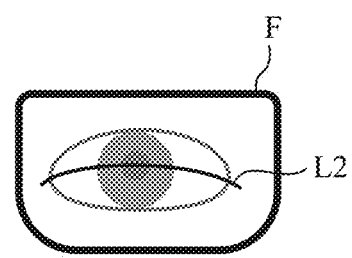
FIG. 6B is a diagram when the eyelid line of FIG. 6A is plotted.

In contrast, FIG. 5B shows condition around the driver's eye, the condition being different to that in FIG. 5A. In FIG. 5B, although an eye-opening state of the driver is similar to that in FIG. 5A, scenery is reflected entirely in the eyeglass lens surface, so that the eyelids appear in a faded state in the image. In addition, for example, an edge A of a dashboard is reflected in the eyeglass lens surface. With respect to the condition shown in FIG. 5B, the eyelid detected by the eyelid detection unit 3 is provided as, for example, an eyelid line L2 shown in FIG. 6A. FIG. 6B is a diagram when the eyelid line L2 is plotted on the eye area. The eyelid line L2 is plotted at a position apart from the actual eyelids. Namely, the eyelid detection unit 3 has erroneously detected the edge A of the dashboard as the eyelid. In this case, at each of the pixels on the eyelid line L2, the degree of similarity between the normal vector Va and the luminance vector Vb is low, so that the eyelid evaluation value, and thus the eyelid reliability, is lower as compared with the case of FIG. 5A.

Using the eyelid reliability outputted from the reliability calculation unit 4, the determination unit 5 determines whether the eyelid detection unit 3 has properly detected the eyelid. Specifically, when the eyelid reliability calculated by the reliability calculation unit 4 is less than a first threshold value, the determination unit 5 determines that the eyelid has not been properly detected. The first threshold value is preset to a value higher than the eyelid reliability calculated in such condition as shown in FIG. 5B, for example.

The determination unit 5 outputs its determination result to the state determination unit 6.

Using the positional information of the eyelid detected by the eyelid detection unit 3, the state determination unit 6 calculates an eye open-closed state. For example, the state determination unit 6 calculates an eye-opening degree as the eye open-closed state. The eye-opening degree is calculated by a publicly known method. For example, the eye-opening degree is calculated using a flatness ratio of the eyelid line determined from the positional information of the eyelid detected by the eyelid detection unit 3. Further, using the determination result outputted from the determination unit 5, the state determination unit 6 determines whether to make the calculated open-closed state valid or invalid. The open-closed state determined to be valid is to be treated as that which adequately represents the open-closed state of an actual eye of the driver. In contrast, the open-closed state determined to be invalid is to be treated as that which does not adequately represent the open-closed state of the actual eye of the driver. Accordingly, the open-closed state determined to be invalid is to toe discarded immediately, for example.

It is noted that the state determination unit 6 may be configured to toe capable of calculating an eye direction or an arousal degree. When having determined that the open-closed state is valid, the state determination unit 6 may calculate the eye direction. Further, when having determined that the open-closed state is valid, the state determination unit 6 may calculate the arousal degree. The arousal degree is an index indicating a degree of arousal of the driver, and is calculated on the basis of a temporal variation of the eye-opening degree, as exemplified by a case where, when the eye-opening degrees each corresponding to an eye that is closed are calculated successively, an arousal degree indicating the failing asleep is calculated.

Figure 7A:
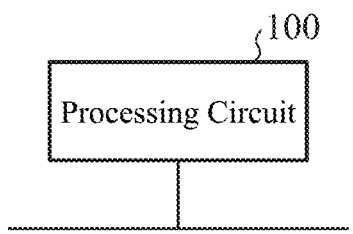
FIG. 7A and FIG. 7B are diagrams each showing a hardware configuration example of the erroneous detection determination apparatus according to Embodiment 1.
Figure 7B:
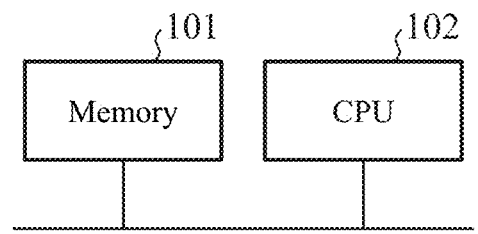

Next, using FIG. 7A and FIG. 7B, hardware configuration examples of the erroneous detection determination apparatus 10 will toe described.

Functions of the image acquisition unit 1, the area extraction unit 2, the eyelid detection unit 3, the reliability calculation unit 4, the determination unit 5 and the state determination unit 6 of the erroneous detection determination apparatus 10 are implemented by a processing circuit. The processing circuit may be dedicated hardware, or may be a Central Processing Unit (CPU) which executes a program stored in a memory. The CPU is also referred to as a central processing device, a processing device, an arithmetic device, a microprocessor, a microcomputer, a processor or a Digital Signal Processor (DSP).

FIG. 7A is a diagram showing the hardware configuration example in a case where the functions of the image acquisition unit 1, the area extraction unit 2, the eyelid detection unit 3, the reliability calculation unit 4, the determination unit 5 and the state determination unit 6 are implemented by a processing circuit 100 as dedicated hardware. What corresponds to the processing circuit 100 is, for example, a single circuit, a composite circuit, a programmed processor, a parallel-programmed processor, an Application Specific Integrated Circuit (ASIC), a Field Programmable Gate Array (FPGA) or any combination thereof. The functions of the image acquisition unit 1, the area extraction unit 2, the eyelid detection unit 3, the reliability calculation unit 4, the determination unit 5 and the state determination unit 6 may be implemented by a combination of two or more processing circuits 100, or the functions of the respective units may be implemented by one processing circuit 100.

FIG. 7B is a diagram showing the hardware configuration example in a case where the functions of the image acquisition unit 1, the area extraction unit 2, the eyelid detection unit 3, the reliability calculation unit 4, the determination unit 5 and the state determination unit 6 are implemented by a CPU 102 which executes a program stored in a memory 101. In this case, the functions of the image acquisition unit 1, the area extraction unit 2, the eyelid detection unit 3, the reliability calculation unit 4, the determination unit 5 and the state determination unit 6 are implemented by software, firmware or a combination of software and firmware. The software and the firmware are each written as a program and stored in the memory 101. The CPU 102 reads out and executes a program stored in the memory 101 to thereby implement the functions of the image acquisition unit 1, the area extraction unit 2, the eyelid detection unit 3, the reliability calculation unit 4, the determination unit 5 and the state determination unit 6. Namely, the erroneous detection determination apparatus 10 has the memory 101 for storing programs, etc. by which the processing of Steps ST1 to ST23 shown in the flowcharts of FIG. 3, FIG. 9 and FIG. 10 to be described later, is performed as a result. Further, it can also be said that these programs are programs for causing a computer to execute procedures or methods which the image acquisition unit 1, the area extraction unit 2, the eyelid detection unit 3, the reliability calculation unit 4, the determination unit 5 and the state determination unit 6 use. Here, what corresponds to the memory 101 is, for example, a non-volatile or volatile semiconductor memory, such as a Random Access Memory (RAM), a Read Only Memory (ROM), a flash memory, an Erasable Programmable ROM (EPROM), an Electrically Erasable Programmable ROM (EEPROM) and the like; or a disc-like memory medium, such as a magnetic disc, a flexible disc, an optical disc, a compact disc, a mini disk, a Digital Versatile Disc (DVD) and the like.

It is noted that the functions of the image acquisition unit 1, the area extraction unit 2, the eyelid detection unit 3, the reliability calculation unit 4, the determination unit 5 and the state determination unit 6 may be implemented partly by dedicated hardware and partly by software or firmware. For example, it is allowed that, with respect to the image acquisition unit 1, the area extraction unit 2 and the eyelid detection unit 3, their functions are implemented by a processing circuit as dedicated hardware, and with respect to the reliability calculation unit 4, the determination unit 5 and the state determination unit 6, their functions are implemented by causing a processing circuit to read out and execute a program stored in a memory.

In this manner, using hardware, software, firmware or any combination thereof, the processing circuit can implement the functions of the image acquisition unit 1, the area extraction unit 2, the eyelid detection unit 3, the reliability calculation unit 4, the determination unit 5 and the state determination unit 6.

Next, using the flowchart shown in FIG. 3, an example of processing by the erroneous defection determination apparatus 10 configured as described above will be described.

The sequential processing shown in FIG. 8 is carried out periodically when, for example, the driver has started driving the vehicle.

The image acquisition unit 1 acquires image data indicating an image of the driver (Step ST1). The image acquisition unit 1 outputs the acquired image data to the area extraction unit 2.

Then, using the image data acquired by the image acquisition unit 1, the area extraction unit 2 extracts the eye area in the image indicated by the image data (Step ST2).

The area extraction unit 2 outputs the partial image data corresponding to the eye area of the driver, to the eyelid detection unit 3 and the reliability calculation unit 4.

Then, using the image data outputted from the area extraction unit 2, the eyelid detection unit 3 detects an eyelid in the eye area extracted by the area extraction unit 2 (Step ST3).

The eyelid detection unit 3 outputs the positional information of the detected eyelid to the reliability calculation unit 4 and the state determination unit 6.

Then, using the luminance information of the eye area extracted by the area extraction unit 2 and the positional information of the eyelid detected by the eyelid detection unit 3, the reliability calculation unit 4 calculates the eyelid reliability (Step ST4). The reliability calculation unit 4 outputs the calculated eyelid reliability to the determination unit 5.

Figure 9:
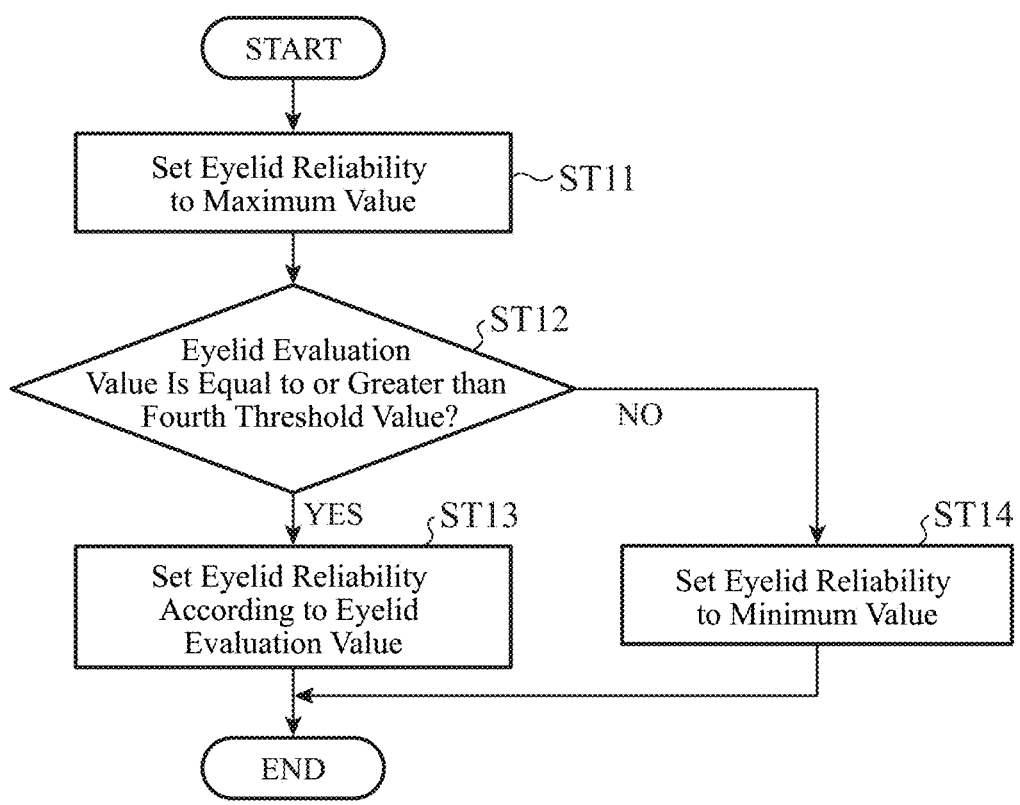
FIG. 9 is a flowchart precisely showing an example of processing in Step ST4 in FIG. 8.

In this respect, in FIG. 9, an example of processing in Step ST4 is illustrated precisely.

First, the reliability calculation unit 4 sets the eyelid reliability to a maximum value as an initial value (Step ST11). When, for example, the eyelid reliability is expressed as a percent, the maximum value of the eyelid reliability is 100.

Then, the reliability calculation unit 4 calculates the eyelid evaluation value in the already described manner. The reliability calculation unit 4 then determines whether the calculated eyelid evaluation value is equal to or greater than the fourth threshold value (Step ST12).

When the eyelid evaluation value is equal to or greater than the fourth threshold value (Step ST12; YES), the reliability calculation unit 4 sets the eyelid reliability in a manner according to the eyelid evaluation value, as shown, for example, in FIG. 4 (Step ST13). When, for example, the eyelid reliability is expressed as a percent, the eyelid reliability to be set in Step ST13 is a value larger than zero. Accordingly, the eyelid reliability set in Step ST11 is updated.

In contrast, when the eyelid evaluation value is less than the fourth threshold value (Step ST12; NO), the reliability calculation unit 4 sets the eyelid reliability to the minimum value (Step ST14). When, for example, the eyelid reliability is expressed as a percent, the minimum value of the eyelid reliability is zero. Accordingly, the eyelid reliability set in Step ST11 is updated. Note that, as already described, when the eyelid evaluation value is less than the fourth threshold value, the reliability calculation unit 4 may decrease, instead of uniformly setting the eyelid reliability to the minimum value, the eyelid reliability in a stepwise manner according to the eyelid evaluation value.

Returning back to FIG. 8, the determination unit 5 determines whether the eyelid reliability calculated in Step ST4 in the above manner is equal to or greater than the first threshold value (Step ST5).

When the eyelid reliability is equal to or greater than the first threshold value (Step ST5; YES), the determination unit 5 determines that the eyelid has been properly detected (Step ST6). The determination unit 5 outputs the determination result to the state determination unit 6.

The state determination unit 6 is in operation for calculating the eye open-closed state by using the positional information of the eyelid detected by the eyelid detection unit 3. The state determination unit 6 determines that the calculated open-closed state is valid (Step ST7).

In contrast, when the eyelid reliability is less than the first threshold value (Step ST5; NO), the determination unit 5 determines that the eyelid has not been properly detected (Step ST5). The determination unit 5 outputs the determination result to the state determination unit 6.

The state determination unit 6 is in operation for calculating the eye open-closed state by using the positional information of the eyelid detected by the eyelid detection unit 3. The state determination unit. 6 determines that the calculated open-closed state is invalid (Step ST9).

Note that the state determination unit 6 may be configured to calculate the eye open-closed state when the eyelid has been determined to be properly detected, and not to calculate the eye open-closed state when the eyelid has been determined to be not properly detected.

In this manner, the erroneous detection determination apparatus 10 determines whether or not the eyelid has been erroneously detected. Even when scenery reflected in an eyeglass lens surface around the eye as shown in FIG. 5B is detected as an eyelid, the erroneous detection determination apparatus 10 can correctly determine that the eyelid has been erroneously detected, so that accuracy is high in determining the erroneous detection.

Further, when, by the determination unit 5, the eyelid has been determined to be not properly detected, the eye open-closed state calculated by the state determination unit 6 is determined to be invalid. Accordingly, in the case where a state of the driver, such as falling asleep, sleepiness, an eye blink and the like, is sensed using the eye open-closed state, sensing capability is improved.

Meanwhile, in order to prevent occurrence of the erroneous detection of an eyelid due to reflection of scenery in the eyeglass lens surface, it is conceivable as a countermeasure, to cause the camera to perform imaging in such a manner that no scenery is reflected in the eyeglass lens surface. However, in this case, it is necessary to intensify the camera illumination at the time of imaging, so that the cost increases. According to the erroneous detection determination apparatus 10, even in the case without such a countermeasure, it is possible to accurately determine the erroneous detection of an eyelid, to thereby restrain the cost from increasing.

It is noted that the reliability calculation unit 4 may calculate the eyelid reliability according to previously calculated eyelid reliabilities.

Figure 10:
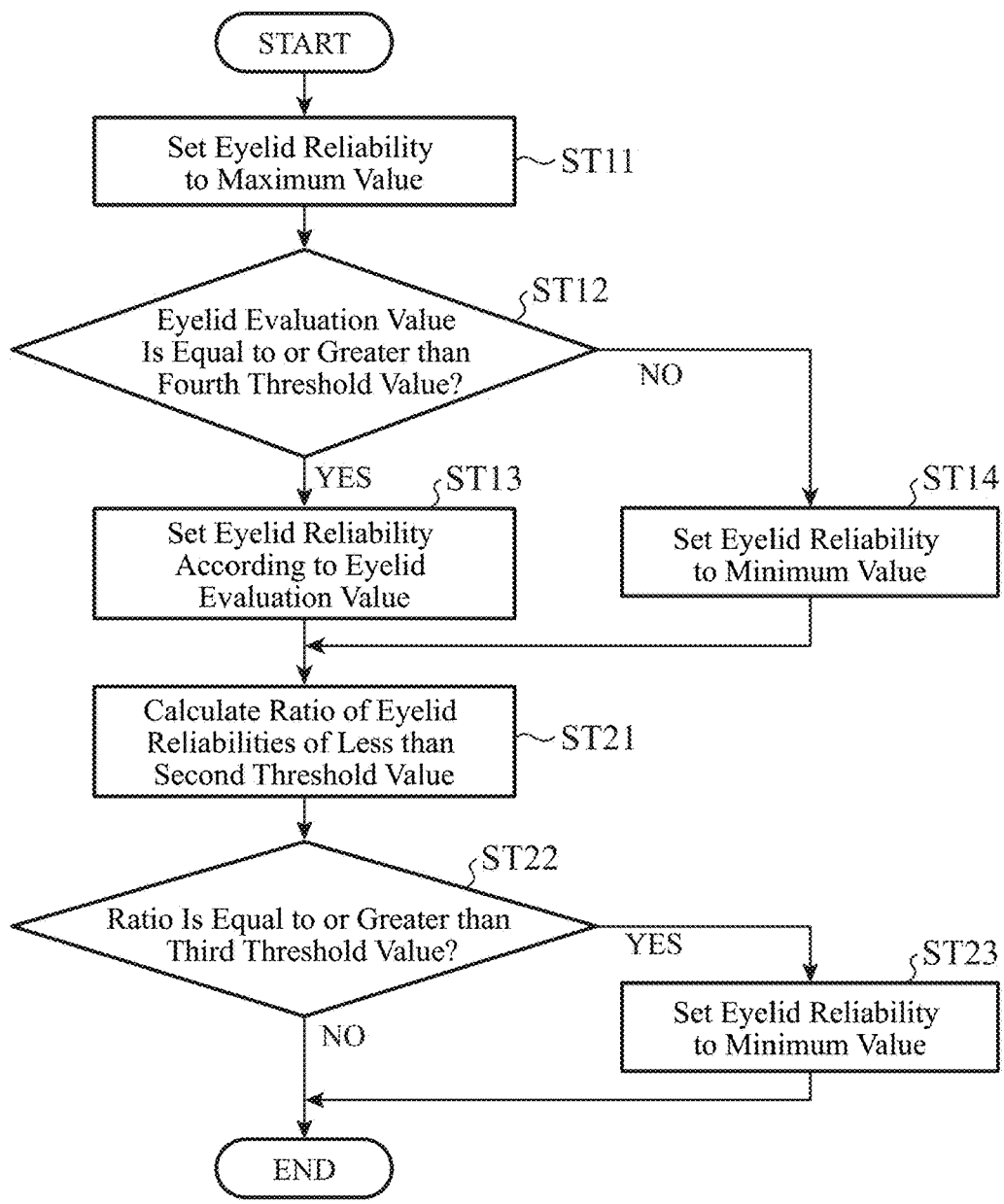
FIG. 10 is a flowchart showing a modified example of calculation processing of the eyelid reliability.

An example of processing in this case will be described using the flowchart shown in FIG. 10. Note that, for the steps that perform processing that is the same as or equivalent to the processing by the steps already described in FIG. 9, the same numerals are given, so that description thereof will be appropriately omitted or simplified.

The reliability calculation unit 4, every time it calculates an eyelid reliability in Step ST4, stores the calculated eyelid reliability in an unshown storage unit. As a result, a history of eyelid reliabilities previously calculated by the reliability calculation unit 4 is stored in the erroneous detection determination apparatus 10.

Subsequent to Step ST13 or Step ST14, the reliability calculation unit 4 reads out a history of eyelid reliabilities from the unshown storage unit. At this time, the reliability calculation unit 4 reads out the history of eyelid reliabilities on a series of images from one frame to specified frames before a target image for which the eyelid reliability has been calculated in Step ST13 or Step ST14. Accordingly, one or a plurality of eyelid reliabilities is read out. When, for example, the specified frames are five frames, the reliability calculation unit 4 reads out five eyelid reliabilities corresponding to the images from one frame to five frames before the target image for which the eyelid reliability has been calculated in Step ST13 or Step ST14.

Then, the reliability calculation unit 4 calculates a ratio, in the eyelid reliabilities thus read out, of eyelid reliabilities of less than a second threshold value (Step ST21). In this manner, the reliability calculation unit 4 calculates a ratio of images each with the eyelid reliability of less than the second threshold value, in the images indicated by the image data previously acquired by the image acquisition unit 1. Note that the second threshold value may be set to the same value as the first threshold value, or may be set to a value less than the first threshold value.

Then, the reliability calculation unit 4 determines whether the thus-calculated ratio is equal to or greater than a third threshold value (Step ST22).

When the calculated ratio is equal to or greater than the third threshold value (Step ST22; YES), the reliability calculation unit 4 sets the eyelid reliability to a minimum value (Step ST23). Note that, at this time, since the reliability calculation unit 4 only has to decrease the eyelid reliability, the reliability calculation unit. 4 may decrease the eyelid reliability to a value other than the minimum value. Accordingly, the eyelid reliability set in Step ST13 or Step ST14 is updated and then outputted to the determination unit 5.

In contrast, when the calculated ratio is less than the third threshold value (Step ST22; NO), the reliability calculation unit 4 makes no change in the eyelid reliability set in Step ST13 or Step ST14. Namely, the eyelid reliability set in Step ST13 or Step ST14 is outputted to the determination unit 5.

As to the processing shown in FIG. 10, additional description will be made using FIG. 11A, FIG. 11B, FIG. 12, FIG. 13 and FIG. 14.

Figure 11A:
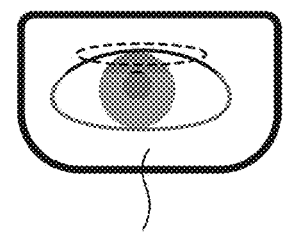
FIG. 11A is a diagram showing a case where, in an eyeglass lens surface, scenery is reflected in a band shape under an eye.

FIG. 11A shows a case where, in an eyeglass lens surface, scenery is reflected in a band shape under the eye. In this case, out of the entire eyelids, only a portion surrounded by a broken line in the figure is to be detected as an eyelid by the eyelid detection unit 3. When the eyelid is detected as described just above, unlike the actual state of the eye, the eye-opening degree is calculated to be low, so that the eye is regarded as if it were nearly closed. Namely, the eyelid detection unit 3 has erroneously detected the eyelid. However, since the normal vectors Va and the luminance vectors Vb are well-matched to each other, the eyelid reliability calculated by the reliability calculation unit 4 is high, so that the determination unit 5 cannot determine that such detection is erroneous detection.

Figure 11B:
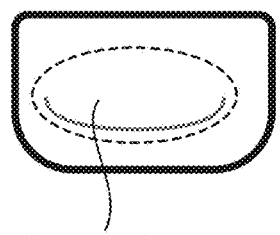
FIG. 11B is a diagram showing a case where, in the eyeglass lens surface, scenery having a contour similar to an eye is reflected.

Further, FIG. 11B shows a case where, in a state in which an eye is closed, scenery having a contour similar to an eye is reflected in the eyeglass lens surface. In this case, an edge portion of the scenery surrounded by a broken line in the figure is to be detected as eyelids by the eyelid detection unit 3. In this case also, since the normal vectors Va and the luminance vectors Vb are well-matched to each other, the eyelid reliability calculated by the reliability calculation unit 4 is high, so that the determination unit 5 cannot determine that such detection is erroneous detection.

Figure 12:
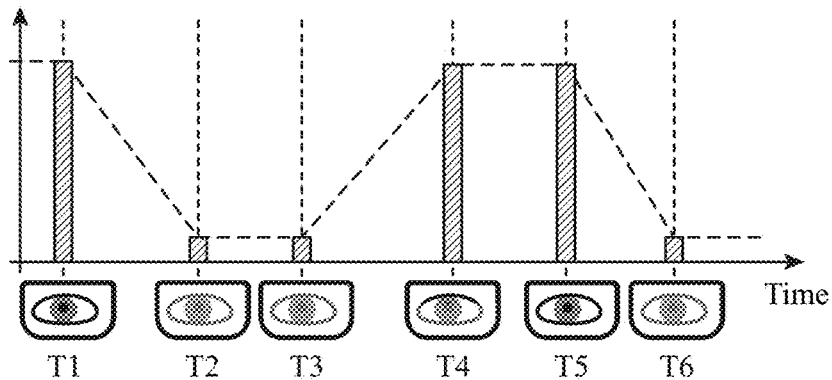
FIG. 12 is a diagram showing an example of temporal transition of scenery reflection and eyelid reliability.

FIG. 12 is a diagram showing an example of temporal transition of scenery reflection and eyelid reliability. Let's assume that the scenery reflection has varied, starting from State T1 to reach State T6 as shown side by side along the horizontal axis. In FIG. 12, eyelid reliabilities are shown that have been calculated for the images reflecting the respective States T1 to T6, by the reliability calculation unit 4 in accordance with the processing shown in FIG. 9. At each of States T1 and T5, since there is no scenery reflection, the eyelid reliability is calculated to foe high. At each of States T2, T3 and T6, since scenery is reflected entirely in the eyeglass lens surface, the eyelid reliability is calculated to be low. At State T4, as has been described using FIG. 11A, even though the eyelid detection unit 3 has erroneously detected the eyelid, the eyelid reliability is calculated to be high.

Figure 13:
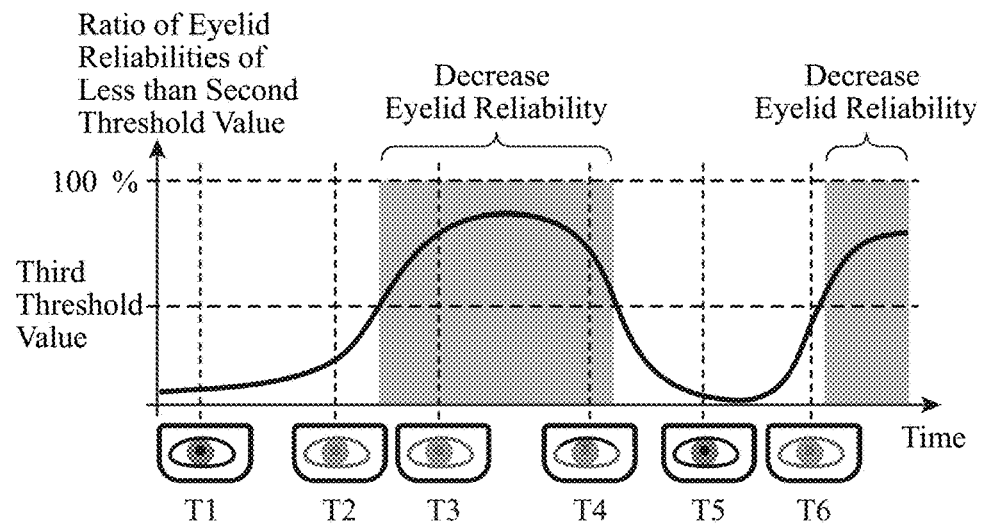
FIG. 13 is a diagram corresponding to a case where scenery reflections shown in FIG. 12 have occurred, and showing an example of temporal transition of a ratio of images each with the eyelid reliability of less than a second threshold value, in previous images.
Figure 14:
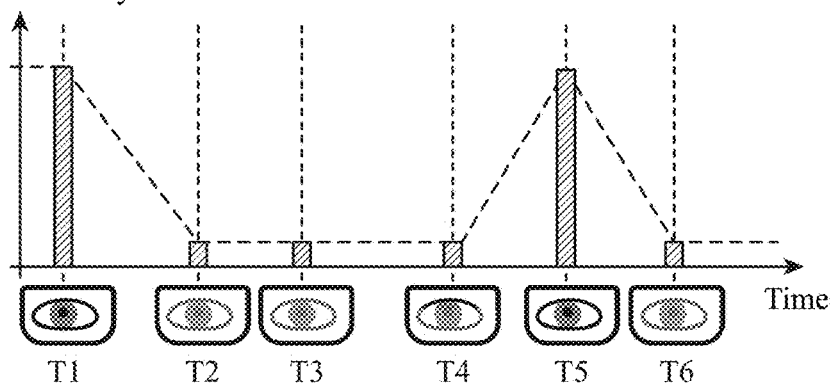
FIG. 14 is a diagram showing eyelid reliabilities calculated in accordance with the processing shown in FIG. 10, in the case where scenery reflections shown in FIG. 12 have occurred.

FIG. 13 is a diagram corresponding to the case where scenery reflections shown in FIG. 12 have occurred, and showing an example of temporal transition of a ratio of images each with the eyelid reliability of less than the second threshold value, in previous images. For example, the ratio at State T3 is provided as a ratio of images each with the eyelid reliability calculated to be less than the second threshold value, in the images of specified frames at and prior to State T2. In accordance with the processing shown in FIG. 10, when the transition of the ratio is as shown in FIG. 13, the eyelid reliability is set to the minimum value at each of States T3 and T4. Namely, as shown in FIG. 14, the eyelid reliability is low also at State T4. Accordingly, with respect to State T4, the determination unit 5 can determine that the eyelid has been erroneously detected.

In this manner, at the time the reliability calculation unit 4 calculates the eyelid reliability, not only the image currently subject to processing but also the images previously subject to processing are taken into consideration, so that accuracy is more improved in determining the erroneous detection.

It is noted that, in the foregoing, a case is shown where the erroneous detection determination apparatus 10 is installed in a vehicle. However, the image acquisition unit 1, the area extraction unit 2, the eyelid detection unit 3, the reliability calculation unit 4, the determination unit 5 and the state determination unit 6, which are included in the erroneous detection determination apparatus 10, may be configured in an unshown server outside the vehicle. In this case, the unshown server acquires image data indicating an image of the driver through wireless communication from the vehicle, to thereby determine the erroneous detection of an eyelid. Further, on the basis of the calculated eye open-closed state, the unshown server transmits, where necessary, a signal for informing the driver of a warning, to the vehicle. In this manner, a server may function as the erroneous detection determination apparatus 10.

Further, in the foregoing, although the erroneous detection determination apparatus 10 is installed in a vehicle, the erroneous detection determination apparatus 10 may instead be a smartphone or the like of the driver or the like, brought into a vehicle. In this case, the smartphone acquires image data indicating an image of the driver, by using an unshown camera for imaging the driver installed in the vehicle, or a camera built in the smartphone.

Further, for example, it is allowed that the eyelid detection unit 3 and the reliability calculation unit 4 are configured in an unshown server outside the vehicle and thereby the unshown server performs detection of the eyelid and calculation of the eyelid reliability. In this case, the unshown server acquires image data indicating the eye area through wireless communication from the vehicle, to thereby determine the erroneous detection of an eyelid. Then, the unshown server transmits the positional information of the detected eyelid and the calculated eyelid reliability to the vehicle. In this manner, the units that are included in the erroneous detection determination apparatus 10 may be distributed at different places such as a vehicle and a server outside the vehicle.

Further, in the foregoing, the description has been made citing the driver of a vehicle as an example; however, the erroneous detection determination apparatus 10 may be used for a driver/operator of a moving object other than a vehicle, as a target.

Further, the erroneous detection determination apparatus 10 may be that which outputs, without having the state determination unit 6, a processing result to an external apparatus. Namely, the erroneous detection determination apparatus 10 outputs the positional information of the eyelid detected by the eyelid detection unit 3 and the determination result by the determination unit 5, to the state determination unit 6 provided outside the erroneous detection determination apparatus 10. Upon receiving the output from the erroneous detection determination apparatus 10, the state determination unit 6 provided outside the erroneous detection determination apparatus 10 calculates the eye open-closed state, to thereby sense a state of the driver, such as falling asleep, sleepiness, an eye blink and the like.

As described above, according to Embodiment 1, since the reliability calculation unit 4 calculates the eyelid reliability by using the luminance information of the eye area and the positional information of the eyelid, and the determination unit 5 determines using the eyelid reliability whether or not the eyelid has been erroneously detected, it is possible to improve accuracy in determining the erroneous detection.

In another aspect, the erroneous detection determination apparatus 10 is provided with the state determination unit 6 for calculating the eye open-closed state by using the positional information of the eyelid detected by the eyelid detection unit 3, and when the determination unit 5 determines that the eyelid has not been properly detected, the state determination unit 6 determines that the calculated open-closed state is invalid. Accordingly, in the case where a state of the driver, such as failing asleep, sleepiness, an eye blink and the like, is sensed using the eye open-closed state, sensing capability is improved.

In another aspect, when, in the images indicated by the respective pieces of image data having been acquired by the image acquisition unit 1, the ratio of images each with the eyelid reliability of less than the second threshold value, is not less than the third threshold value, the reliability calculation unit 4 decreases the eyelid reliability that is calculated by using the luminance information and the positional information of the eyelid, and the determination unit 5 performs the determination by using the eyelid reliability decreased by the reliability calculation unit 4. Accordingly, accuracy is more improved in determining the erroneous detection.

In another aspect, the reliability calculation unit 4 calculates the eyelid reliability by using the inner products of the respective luminance vectors obtained from the luminance information and the respective normal vectors of an eyelid line obtained from the positional information. Accordingly, it is possible to calculate the eyelid reliability, adequately.

It should be noted that modification of any component in the embodiment and omission of any component in the embodiment may be made in the present invention without departing from the scope of the invention.

INDUSTRIAL APPLICABILITY

As describe above, the erroneous detection determination apparatus according to the invention can improve accuracy in determining whether or not the eyelid has been erroneously detected, and is thus suited for use in a manner incorporated in a system for performing processing upon detection of an eyelid, for example, a driver monitoring system.

REFERENCE SIGNS LIST

1: image acquisition unit, 2: area extraction unit, 3: eyelid detection unit, 4: reliability calculation unit, 5: determination unit, 6: state determination unit, 10: erroneous detection determination apparatus, 100: processing circuit, 101: memory, 102: CPU.

The invention claimed is:

1. An erroneous detection determination apparatus, comprising:

processing circuitry to acquire image data indicating an image of a driver;

to extract an eye area in the image by using the image data acquired;

to detect an eyelid in the eye area extracted;

to calculate an eyelid reliability by using luminance information of the eye area extracted and positional information of the eyelid detected; and to determine that the eyelid has not been properly detected, when the eyelid reliability calculated is less than a first threshold value, wherein the processing circuitry calculates, for each of pixels corresponding to the eyelid detected, an inner product of a luminance vector obtained from the luminance information and a normal vector of an eyelid line obtained from the positional information, calculates a total value of the inner products calculated for the respective pixels. and calculates the eyelid reliability on a basis of the total value.

2. The erroneous detection determination apparatus of claim 1, wherein the processing circuitry calculates an eye open-closed state by using the positional information of the eyelid detected, and when it is determined that the eyelid has not been properly detected, determines that the calculated open-closed state is invalid.

3. The erroneous detection determination apparatus of claim 1, wherein when, in images indicated by respective pieces of image data having been acquired by the processing circuitry, a ratio of images each with the eyelid reliability of ess than a second threshold value, is not less than a third threshold value, the processing circuitry decreases the eyelid reliability that is calculated by using the luminance information and the positional information of the eyelid, and performs the determination as to whether the eyelid has not been properly detected, by using the eyelid reliability decreased.

4. The erroneous detection determination apparatus of claim 2, wherein when, in images indicated by respective pieces of image data having been acquired by the processing circuitry, a ratio of images each with the eyelid reliability of less than a second threshold value, is not less than a third threshold value, the processing circuitry decreases the eyelid reliability that is calculated by using the luminance information and the positional information of the eyelid, and performs the determination as to whether the eyelid has not been properly detected, by using the eyelid reliability decreased.

5. An erroneous detection determination apparatus, comprising:

processing circuitry to acquire image data indicating an image of a driver;

to extract an eye area in the image by using the image data acquired;

to detect an eyelid in the eye area extracted;

to calculate an eyelid reliability by using luminance information of the eye area extracted and positional information of the eyelid detected;

to determine that the eyelid has not been properly detected, when the eyelid reliability calculated is less than a first threshold value; and to calculate an eye open-closed state by using the positional information of the eyelid detected, wherein when it is determined that the eyelid has not been properly detected, the processing circuitry determines that the calculated open-closed state is invalid, and when, in images indicated by respective pieces of image data having been acquired by the processing circuitry, a ratio of images each with the eyelid reliability of less than a second threshold value, is not less than a third threshold value, the processing circuitry decreases the eyelid reliability that is calculated by using the luminance information and the positional information of the eyelid, and performs the determination as to whether the eyelid has not been properly detected, by using the eyelid reliability decreased.

6. The erroneous detection determination apparatus of claim 5, wherein the processing circuitry calculates the eyelid reliability by using inner products of respective luminance vectors obtained from the luminance information and respective normal vectors of an eyelid line obtained from the positional information.

7. An erroneous detection determination method, comprising:

acquiring image data indicating an image of a driver;

extracting an eye area in the image by using the image data acquired;

detecting an eyelid in the eye area extracted;

calculating an eyelid reliability by using luminance information of the eye area extracted and positional information of the eyelid detected;

determining that the eyelid has not been properly detected, when the eyelid reliability calculated is less than a first threshold value;

calculating, for each of pixels corresponding to the eyelid detected, an inner product of a luminance vector obtained from the luminance information and a normal vector of an eyelid line obtained from the positional information; and calculating a total value of the inner products calculated for the respective pixels, wherein the eyelid reliability is calculated on a basis of the total value.

* * * * *